June 11, 1929.  A. KOSSEY  1,716,824
BRAKE RELEASE FOR AUTOMOBILES
Filed Dec. 17, 1927
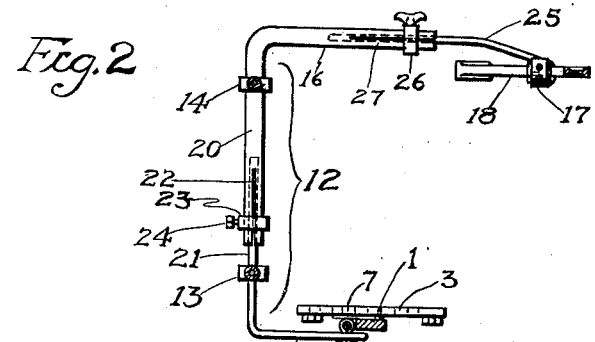
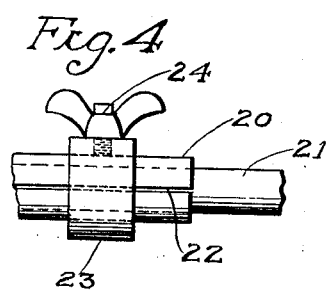
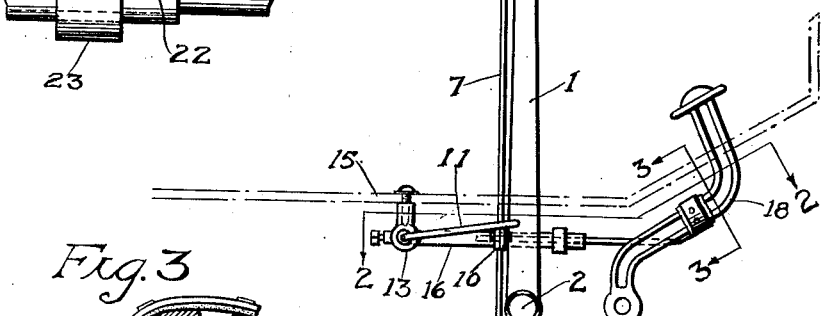
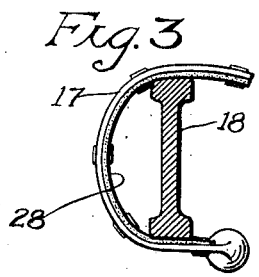
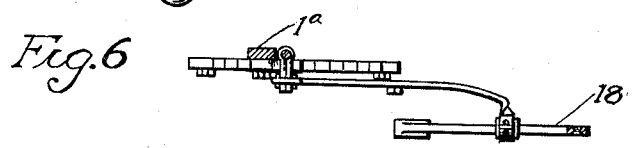
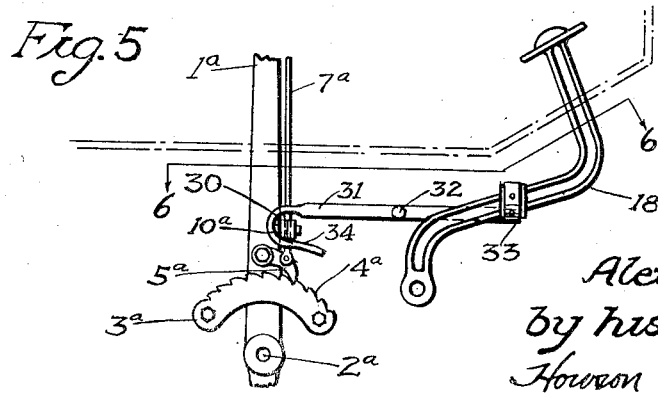
Inventor:
Alexander Kossey,
by his Attorneys:
Howson & Howson Patented June 11, 1929.

1,716,824

UNITED STATES PATENT OFFICE.

ALEXANDER KOSSEY, OF MONT CLARE, PENNSYLVANIA.

BRAKE RELEASE FOR AUTOMOBILES.

Application filed December 17, 1927. Serial No. 240,729.

The object of my invention is to provide in an automobile means for releasing the emergency brake thereof upon the initial operation of the clutch pedal in starting the car.

The details of my invention will be fully disclosed hereinafter, reference being had to the accompanying drawings, of which:

Fig. 1 illustrates sufficient of the mechanism of an automobile to illustrate the principles of my invention as applied thereto;

Fig. 2 is a sectional plan view on the line 2—2 of Fig. 1;

Fig. 3 is a section on the line 3—3, Fig. 1, drawn to an enlarged scale;

Fig. 4 is an enlarged detail of the invention;

Fig. 5 is a view similar to Fig. 1 illustrating a modified form of the invention, and Fig. 6 is a sectional plan view on the line 6—6, Fig. 5.

In the drawings, the emergency brake lever of ordinary construction is illustrated at 1, being pivoted at 2 to a portion of the automobile in the usual manner. Rigidly mounted below the pivot 2 of the lever 1 is a ratchet segment 3 of usual construction having teeth 4 which are adapted to be engaged by a pawl 5 pivoted to the lever 1 at 6. A pawl release rod 7 is pivotally connected to the pawl 5 and projects upwardly substantially parallel to the lever 1 provided at its upper end with a release head 8 which is slidably mounted in the hand grip 9 of the lever 1, the usual spring (not shown) being provided for the purpose of maintaining the pawl 5 in engagement with the ratchet segment 3. To the release rod 7 is removably secured a lug 10, which is adapted to be engaged by an arm 11 projecting from a shaft 12 which is rotatably mounted in bearings 13 and 14 secured to the floor 15 of the machine.

The shaft 12 is provided with a second arm 16 having a yoke 17 formed at its outer end which is adapted to embrace the clutch pedal 18 in the manner illustrated in Fig. 3. The shaft 12 is composed of a tubular section 20 and a solid section 21 adapted to slide within the tubular section 20 for the purpose of permitting lateral adjustment in order that the arms 11 and 16 may be brought into proper operating relation to the brake lever 1 and the clutch pedal 18. The end of the tubular section 20 is split longitudinally as illustrated at 22 and a collar 23 is mounted thereon and provided with a clamp screw 24, whereby the solid section 21 of the shaft may be rigidly clamped within the tubular section 20 thereof for operation as a rigid single element.

The arm 16 constitutes a continuation of the tubular section 20 of the shaft and is adapted to telescopically receive a solid section 25 on which the yoke 17 is integrally formed, a clamp 26 being provided and operable in the manner as above described for rigidly clamping the solid section 25 of the arm 16 to the tubular section 27 thereof.

Obviously this construction provides for adjustment of the length of the arm 16 in order that the said lever may properly engage the clutch pedal 18. The yoke 17 is provided with a suitable lining 28 for the purpose of preventing a rattling between the said yoke and the said clutch pedal.

In operation, assuming that the emergency brake is set and the car at a stand still, in order to start the car it is necessary to press the clutch pedal 18 for the purpose of placing the transmission of the car in low gear. Immediately upon the operation of the clutch pedal 18, the arm 16 is depressed thereby rotating the shaft 12 and rocking the arm 11 which moves the release rod 7 downwardly, thereby releasing the pawl 5 from the ratchet segment 3. The usual springs of the brake mechanism acting to release the brake shoes from the drums will cause the lever 1 to turn on its pivot 2 to such a position that when the clutch pedal 18 is again released and the elements of my invention returned to the normal position the lever 1 will be in a position indicating complete release of the emergency brake.

Figs. 1 and 2 illustrate the emergency brake lever 1 as being located in the center of the automobile and the clutch pedal adjacent the left side thereof, whereas Figs. 5 and 6 illustrate an emergency brake 1ᵃ as being located at the left side of the machine adjacent the clutch pedal 18. In this case the ratchet segment 3ᵃ is located above the pivot 2ᵃ of the emergency lever 1ᵃ and the teeth 4ᵃ of the ratchet segment are located in the upper edge of the said segment, the pawl 5ᵃ being adapted to be raised relative to the segment 3ᵃ in order to release the emergency brake lever.

The release rod 7ᵃ is provided with a detachable projection 10ᵃ which lies within a hook portion 30 formed on one end of a rigid lever 31 which is pivoted at 32 to a suitable portion of the automobile. The lever 31, at the end opposite the hook 30, is provided with an integrally formed yoke 33 which embraces the clutch pedal 18ª in the manner illustrated. The operation of this form of the device is similar to that above described.

Upon initial depression of the clutch pedal 18ª the lever 31 is rocked about its pivot 32, the crook end 34 of said lever engaging the under side of the projection 10ª on the release rod 7ª and raising the pawl 5ª out of engagement with the teeth 4ª of the ratchet segment 3ª, whereupon the emergency brake lever 1ª is turned about its pivot 2ª by the action of the brake springs as above described.

I claim:

1. The combination with the power controlling foot operated pedal and the emergency brake lever of an automobile of lever mechanism pivoted to a normally fixed portion of the automobile and comprising an arm engaging said foot pedal and an arm adapted to engage a projection on the release rod of said brake lever, whereby said brake lever will be released upon initial operation of said pedal.

2. The combination with the power controlling foot operated pedal of an automobile and the emergency brake mechanism thereof, said brake mechanism including a ratchet segment, a lever having a pawl thereon adapted to engage said ratchet segment and a release rod for controlling the operation of said pawl, of means for releasing said pawl from said ratchet segment upon the initial operation of said foot pedal, comprising a projection adapted to be secured to said pawl release rod, and lever mechanism pivoted to a normally fixed portion of said automobile and having an arm engaging said pedal and a second arm engaging the said projection on said pawl release rod.

3. The combination with the power controlling foot operated pedal of an automobile and the emergency brake mechanism thereof, said brake mechanism including a ratchet segment, a lever having a pawl thereon adapted to engage said ratchet segment and a release rod for controlling the operation of said pawl, of means for releasing said pawl from said ratchet segment upon the initial operation of said foot pedal, comprising a projection adapted to be secured to said pawl release rod, a shaft rotatably mounted on a normally fixed portion of the automobile, an arm carried by one end of said shaft engaging said pedal and a second arm carried by the opposite end of said shaft adapted to engage the said projection on the pawl release rod.

4. The combination with the power controlling foot operated pedal and the emergency brake lever of an automobile of means cooperating with said pedal and said lever for releasing said lever upon initial operation of said pedal comprising a tubular element bent at a right angle to form a shaft section and an arm section, a second element bent at a right angle to form a shaft section adapted to telescope within the said tubular shaft section and an arm section adapted to cooperate with said brake lever, a second arm section adapted to telescope within the arm section of the tubular element and to engage said pedal, and means for rigidly securing the telescoping elements within the tubular element to form a single operating element.

5. The combination with the power controlling foot operated pedal of an automobile and the emergency brake mechanism thereof, said brake mechanism including a ratchet segment, a lever having a pawl thereon adapted to engage said ratchet segment and a release rod for controlling the operation of said pawl, of means for releasing said pawl from said ratchet segment upon the initial operation of said foot pedal, comprising a projection adapted to be secured to said pawl release rod, a shaft rotatably mounted on a normally fixed portion of the automobile, an arm carried by one end of said shaft engaging said pedal and a second arm carried by the opposite end of said shaft adapted to engage the said projection on the pawl release rod said shaft being tubular in form, and one of said arms being provided with a lateral extension adapted to telescope within said tubular shaft whereby angular relation between the two said arms may be varied to any desired extent.

6. The combination with the power controlling foot operated pedal of an automobile and the emergency brake mechanism thereof, said brake mechanism including a ratchet segment, a lever having a pawl thereon adapted to engage said ratchet segment and a release rod for controlling the operation of said pawl, of means for releasing said pawl from said ratchet segment upon the initial operation of said foot pedal, comprising a projection adapted to be secured to said pawl release rod, a shaft rotatably mounted on a normally fixed portion of the automobile, an arm carried by one end of said shaft engaging said pedal and a second arm carried by the opposite end of said shaft adapted to engage the said projection on the pawl release rod said shaft being tubular in form, one of said arms being provided with a lateral extension adapted to telescope within said tubular shaft whereby angular relation between the two said arms may be varied to any desired extent, and means for contracting said tubular shaft around the said lateral projection whereby relative rotational movement between these elements is prevented.

ALEXANDER KOSSEY.